(12) United States Patent
Hastings et al.

(10) Patent No.: US 6,303,921 B1
(45) Date of Patent: Oct. 16, 2001

(54) METHOD AND SYSTEM FOR CAPTURING LARGE FORMAT DOCUMENTS USING A PORTABLE HAND-HELD SCANNER

(75) Inventors: Brian L Hastings; David C Rohn, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/447,606

(22) Filed: Nov. 23, 1999

(51) Int. Cl.[7] .............................. H01J 40/14; H04N 5/335

(52) U.S. Cl. ...................... 250/208.1; 358/474; 348/303

(58) Field of Search ................................ 250/208.1, 234, 250/559.3; 358/473, 474, 482, 483, 486, 488, 496, 497; 382/311–316; 348/302–304, 307–311, 315, 316

(56) References Cited

U.S. PATENT DOCUMENTS

| | | | |
|---|---|---|---|
| 5,578,813 | 11/1996 | Allen et al. | 250/208.1 |
| 5,644,139 | 7/1997 | Allen et al. | 250/557 |
| 5,729,008 | 3/1998 | Blalock et al. | 250/208.1 |
| 5,825,044 | 10/1998 | Allen et al. | 250/557 |
| 5,949,483 | * 9/1999 | Fossum et al. | 250/208.1 |

* cited by examiner

*Primary Examiner*—Stephone B. Allen

(57) ABSTRACT

A scanning device includes a mode for generating a reproduced image on a standard page size from a large-sized original image. In this mode, the sampling rate of the scanning device in a motion direction is reduced. In addition, the captured image data in the sensor direction is downsampled by some factor. Position data that is generated as the image data is captured is also modified in accordance with the downsampling factor. A reproduced image is then generated from the modified image and position data and printed at a standard resolution.

9 Claims, 11 Drawing Sheets

METHOD AND SYSTEM FOR CAPTURING LARGE FORMAT DOCUMENTS USING A PORTABLE HAND-HELD SCANNER

FIELD OF THE INVENTION

The present invention relates generally to devices and methods for forming scanned electronic images of originals, and more particularly to scanning devices and methods that transform large captured images into standard page sizes.

BACKGROUND OF THE INVENTION

Original images created on flipcharts or whiteboards and other large format drawings are used for a variety of purposes. Typically, these images may be drawn by hand or are left in a form that makes them available solely in the format on which the images were created. For example, a hand drawn image on a flip chart sheet of paper is solely available on that sheet of paper. As a result, the image is generally not available to be shown to others in the absence of the sheet of paper itself.

There are several methods for making these types of images more readily available. For example, the image may be transcribed or manually written down or typed into a computer. Once in the computer, the transcribed image may be reproduced or transmitted at will. This method, however, is labor intensive and may result in inaccuracies due to errors in transcription.

Another method is to use an electronic whiteboard or a similar device in place of a flipchart. Such devices electronically sense the image on the whiteboard and provide a means for saving this image, for example, in a computer memory. There are drawbacks to electronic whiteboards including that they are limited in the manner in which images are placed on the whiteboard and are generally not portable.

It is also possible to use a photocopier to copy portions of a large image by manipulating the position of the original image to produce multiple copies corresponding to the different sections of the original image. This copying method is very cumbersome and may result in improper alignments of the original image reconstructed from the multiple copies.

Another alternative is to use a high-resolution digital camera to take a digital picture of the original image. These cameras, however, have a limited resolution capability.

Scanners for electronically forming an image of an original are also known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping.

The four types of scanners known in the art are drum scanners, flatbed scanners, two-dimensional array scanners and hand scanners. Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured. In another embodiment, the original is moved, rather than the sensor. This second embodiment is typical of facsimile machines. Precision paper transports provide a high degree of positional accuracy during the image-capture process.

Advantages of the drum and flatbed scanners include the ability to accommodate documents at least as large as A4, or 8.5"×11" paper. Moreover, some of these scanners can handle A1 paper in a single setup. However, the scanners are not generally portable, since they require a host computer for control, data storage and image manipulation. The scanners are also generally incapable of accommodating documents of the size of a flip chart sheet of paper.

Two-dimensional array scanners may be used in the absence of mechanical encoding constraints, and require only that the array and the original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications. For larger sized originals, the cost of these scanners is even more cost-prohibitive.

Conventional hand scanners require a user to move a linear array of electro-optical sensor elements over an original. The movement is by hand manipulation. Array-position information is determined using methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a personal computer for image data storage, processing, and use. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 documents in a single pass. This requires stitching algorithms to join together multiple swaths of a larger document. Swath stitching is done in a separate operation by the personal computer. Scanning a multi-page business document or report with a band scanner is a tedious process that often yields low-quality results.

As previously noted, some type of fixture is typically used with a hand scanner. In the absence of a fixture, there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during a swath of the scanner will also create distortions.

To overcome this image distortion, a scanning device can be used that accommodates curvilinear movement during a scanning process, as described in U.S. Pat. No. 5,578,813 to Allen et al. entitled "Freehand Image Scanning Device Which Compensates for Non-Linear Movement," which is incorporated herein by reference. The scanning device disclosed in Allen et al. accommodates the curvilinear movement it and stitches together the multiple swaths in a low-cost manner and with a high degree of correspondence between the original image and the resulting image.

However, even using the scanning device of Allen et al. has its shortcomings with respect to large original images, such as on a flip chart or whiteboard. In particular, the image captured by this scanning device is large, both with respect to the amount of data stored that corresponds to the captured image, as well as the size of the image presented, both on screen and when printed out. For example, a 34"×44" original document would be stored as a 34"×44" document and printed out as a original document. Accordingly, what is needed is a scanning device that can store, display and print a large original image in more practical and useful sizes and formats.

SUMMARY OF THE INVENTION

A method for forming an output image moves the scanning device along a scan path over an original having an image. An imaging unit of the scanning device captures a sequence of image data and position data in a sensor direction as the scanning device moves along the scan path, the position data being representative of the travel of the scanning device along the scan path. The captured image data is then downsampled by a predetermined factor from a first resolution to a second resolution lower than the first resolution. The position data is also modified in accordance with the predetermined factor. A rectified image is formed based upon the downsampled image data and the modified position data.

In a scanning device for forming an output image, an imaging unit captures a sequence of image data as the scanning device moves along a scan path. A navigation unit captures position data representative of travel of the scanning device along the scan path. A first processor downsamples the captured image data by a predetermined factor from a first resolution to a second resolution lower than the first resolution, and modifies the position data in accordance with the predetermined factor. A second processor forms a rectified image based upon the downsampled image data and the modified position data.

In a computer readable storage device having a utility for forming an output image with a scanning device having an imaging unit, the utility comprises an image capture unit for capturing, with the imaging unit, a sequence of image data and position data in a sensor direction as the scanning device moves along the scan path, the position data being representative of travel of the scanning device along the scan path. A transformation unit downsamples the captured image data by a predetermined factor from a first resolution to a second resolution lower than the first resolution and modifies the position data in accordance with the predetermined factor. A rectification unit forms a rectified image based upon the downsampled image data and the modified position data.

Using this scanning device and method, a large original image, such as a flip chart, can be scanned and reproduced as a smaller original image. The reproduced image can be printed on a standard page size without skewing or distorting the original image.

DETAILED DESCRIPTION OF THE PREFERRED EMBODIMENT

Figure 1:
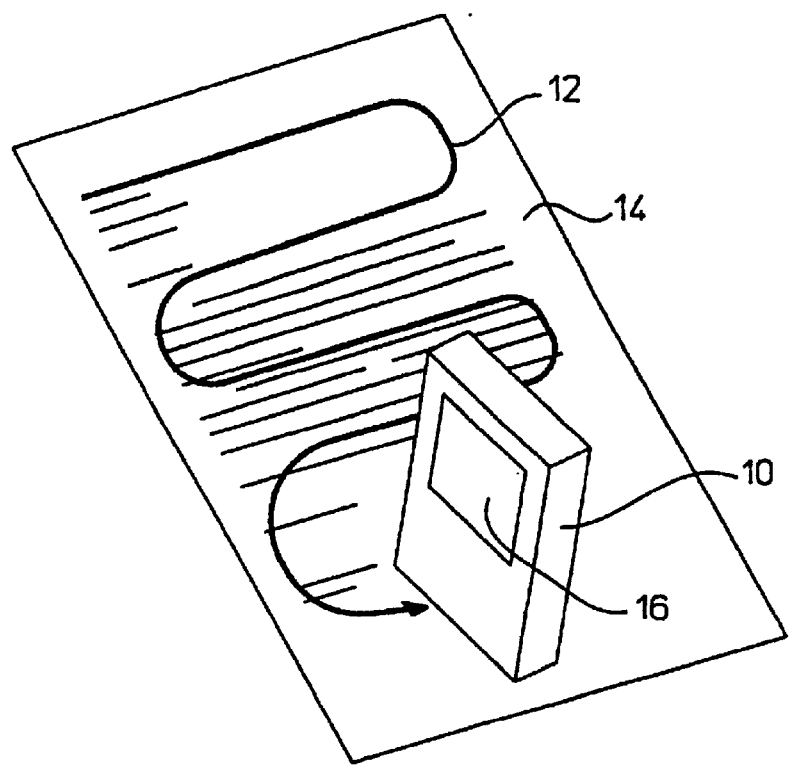
FIG. 1 is a perspective view of a hand-held scanning device following a meandering path on an original in accordance with the invention.

With reference to FIG. 1, a portable, hand-held scanning device 10, such as described in U.S. Pat. No. 5,578,813

(previously incorporated herein by reference) or the HP CapShare 910 or 920, is shown as having followed a meandering path 12 along an original 14. In the preferred embodiment, the original is a piece of paper, an overhead transparency film, or any other image-bearing surface upon which inherent structure-related properties of the original generate sufficient contrast to provide position information during navigation along the meandering path. Typically, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16. The display may provide almost immediate viewing of a captured image. However, a display is not essential to the use of the scanning device.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to an edge of the original 14 (θ axis movement). That is, the linear array of imaging elements may have an angle of attack that is not perpendicular to the direction of device translation.

Figure 2:
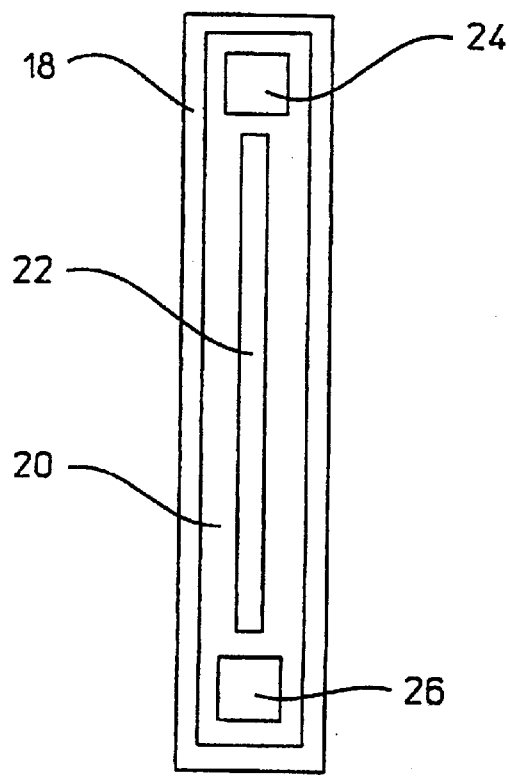
FIG. 2 is a rearward view of imaging and navigation sensors of the scanning device of FIG. 1.
Figure 3:
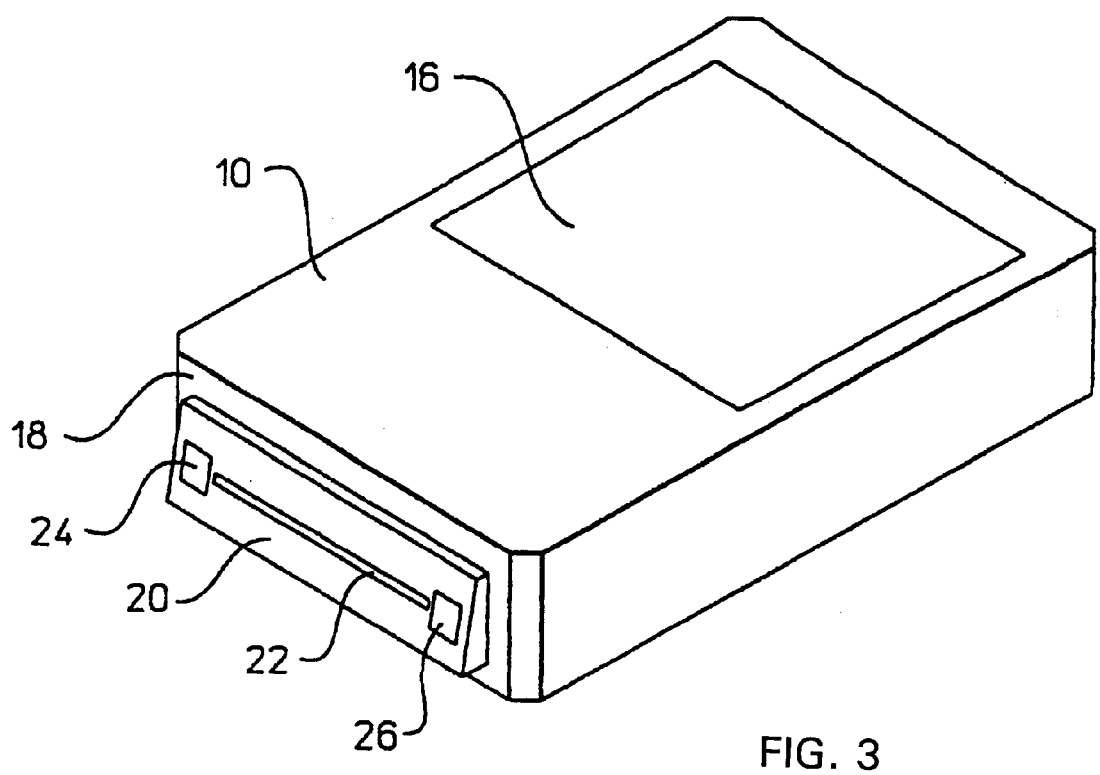
FIG. 3 is a perspective view of the scanning device of FIG. 1, shown with the imaging and navigation sensors exposed.

Referring now to FIGS. 1–3, the forward side 18 of the scanning device 10 includes a pivoting member 20 that aids in maintaining proper contact between the original 14 and an imaging sensor 22. Navigation sensors 24 and 26 are located at the opposed ends of the imaging sensor. Because the navigation sensors may be mounted on the pivoting member, the navigation sensors are in a fixed location relative to the imaging sensor.

For reasons of physical compactness, the imaging sensor array 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a federally registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor is preferably a linear array of discrete optically sensitive elements. The spacing of the elements plays a role in determining the spatial resolution of the scanner 10. For example, a linear array having a length of 101.6 mm (4 inches) requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably fast enough to maintain sufficient spatial resolution to produce an image output of a desired quality. Linear imaging arrays generally produce a serial data stream, wherein pixel values, i.e. charges, are placed into a shift register and then shifted out. Achieving the desired speed requires either fast serial transfer rates out of the entire image array or multiple taps, so that pixel values can be shifted through fewer cells. This introduces parallelism, which is advantageous for digital processing.

A further consideration with respect to the speed of the image sensor unit is the sampling rate of the imaging sensor 22. The sampling rate corresponds to the times that the imaging sensor 22 samples the original 14 over a predetermined distance in the motion direction. Typically, the sampling rate may be 200 dpi, which would produce 200 lines of pixel data over one inch. As will be discussed below, the sampling rate of the imaging sensor is reduced when the scanning device 10 is in a flip chart mode. When in the flip chart mode, the sampling rate of the imaging sensor 22 is reduced by some factor from the standard sampling rate of the imaging sensor 22. For example, if the standard sampling rate is 200 dpi, the sampling rate in the flip chart mode could be reduced by a factor of three, or reduced to approximately 75 dpi.

Another consequence of the speed requirement is that the products of pixel areas, at the surface of the original, and their solid angles of emitted light collected and conveyed to each array element should be sufficiently large to produce a detectable signal. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wave-length of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e. side-to-side passes across the original 14. A useful imaging sensor 22 for most opportunistic applications has a length within the range of 25.4 mm and 127.0 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 typically includes at least one navigation sensor 24 or 26. In the preferred embodiment, the device includes a pair of navigation sensors, with the sensors being at opposite ends of the imaging sensor 22. While a one-dimensional array of opto-electronic elements may be used, in the preferred embodiment, each navigation sensor is a two-dimensional array of elements. The navigation sensors 24 and 26 are used to track movement of the scanning device 10 relative to the original 14.

In the preferred embodiment, each navigation sensor 24 and 26 captures images related to inherent structure-related properties of the original in order to produce information related to the position of the scanning device 10. For most prior art scanning devices, inherent structural features are considered to be noise. For the scanning device of FIGS. 1–3, such features are noise with regard to the imaging sensor 22, but may be used to provide a basis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 μm and 40 μm in size on common printed media. As an alternative, speckle may be used, since specular reflection of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

However, it is contemplated to use the invention for applications in which navigation information is independent of inherent structure-related properties of the original. For example, one or both of the navigation sensors 24 and 26 of FIG. 2 may be used to form successive images of print on the original, with correlation of the successive images being used to determine the position and the orientation of the image sensor 22 along the original 14. In this embodiment, all three sensors 22, 24 and 26 image text on the original, but only the signal from the sensor 22 is used to acquire image data. The signals from the navigation sensors 24 and 26 are used to acquire image-based navigation information.

Non-imaging approaches can also be used to acquire and process X, Y and theta position information. Unfortunately, many of the alternative means impose various limitations upon compactness, convenience of use, speed, freedom of motion, power consumption, accuracy, precision, and/or cost. One imaging-independent alternative available to acquiring position information is to provide one or more encoding wheels in place of the navigation sensors. The encoding wheels may then roll without slip upon the scanned surface, enabling the scanning device to travel along straight or curvilinear trajectories. It is not critical that the encoding wheels be on a common axis. The wheels may be mounted to swivel. Encoders coupled to monitor rotations would provide the input data from which to calculate position and orientation of an imaging sensor relative to a starting position and orientation.

Another image-free approach to acquiring navigation information is to use track balls similar to those for a computer mouse. A track ball could be used in place of each encoder wheel described above. Encoders would be used to obtain two-dimensional displacement information from each track ball. In another approach, optical or electronic (capacitive, resistive or inductive) sensors may be used in place of the navigation sensors of FIG. 2 in order to sense position and orientation relative to a cooperative (active or passive) grid or other reference constructed in an underlying tablet that, in turn, serves as a support for the original being scanned.

Another image-free approach to acquiring position and orientation information is to provide an accelerometer. An on-board inertial navigation platform may be used, with accelerations being sensed and integrated either once to obtain velocities or twice to obtain positions. Or velocities of spring-suspended masses could be sensed and integrated once in order to obtain positions. Gyroscopes could be employed in a direct sensing of orientation.

Yet another alternative approach would be to use any of a variety of mechanical linkages with which to track position and orientation relative to reference coordinates fixed with respect to the medium being scanned. Position and orientation information could be obtained by means of sensors coupled to measure the relative movement of the mechanical members. These sensors could be of either the relative or absolute type and could be based on direct position and orientation sensing, or the sensing of accelerations or velocities that would then be integrated with respect to time, once or twice, to obtain positions. Non-contacting remote sensing could also be used to measure position and orientation of the scanning device relative to reference coordinates fixed with respect to the scanned original. Examples of such non-contacting sensing would include those that use electromagnetic fields, waves or beams (e.g. at optical or radio frequencies); electric effects (e.g. capacitive); and/or magnetic effects (e.g. inductive). These approaches could utilize standard or differential Global Positioning technologies and potentially could use satellites. These approaches can also include traditional navigation/surveying methods, such as triangulations. They could also include techniques employed in robotics technologies, such as using shaped light beams and interpreting position from images of where these beams intercept the moving object.

The navigation sensors 24 and 26 of FIG. 2 effectively observe a moving image of the original 14 and produce an indication of the displacement in two planar dimensions between successive observations. As will be explained more fully below, pixel values from the navigation sensors are operated upon by processing elements to determine proper mapping of image data from the imaging sensor 22. The processing elements operate on a particular pixel and its nearest neighbors to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
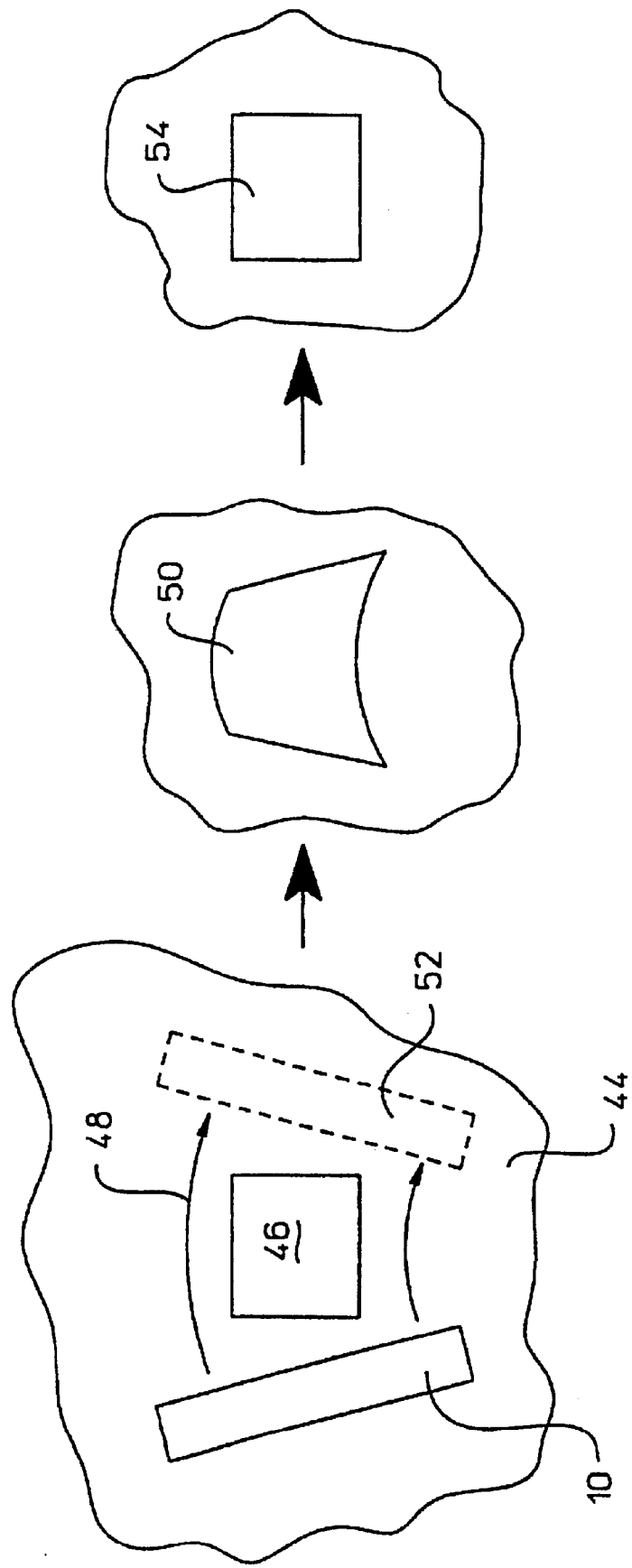
FIG. 4 is a conceptual view of the image capture operation of the scanning device of FIG. 1.

Referring now to FIG. 4, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the hand and forearm of the user rotate about the elbow. In FIG. 4, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the preferred embodiment, one or more navigation sensors capture data related to inherent structural features of the original 44. Movement of the inherent structural features relative to the scanning device 10 is tracked in order to determine displacement of the imaging sensor relative to the block 46. A faithful captured image 54 may then be formed. The image 54 is defined herein as the "rectified" image.

Rectification is the process of converting raw image data, consisting of a sequence of non-uniformly spaced and oriented image sensor line samples along with the x-y rectilinear positions of the image sensor endpoints, into rectilinear image data in a regular x-y grid. This is accomplished by using geometry and trigonometry along with interpolation of image pixel intensity values.

Figure 5:
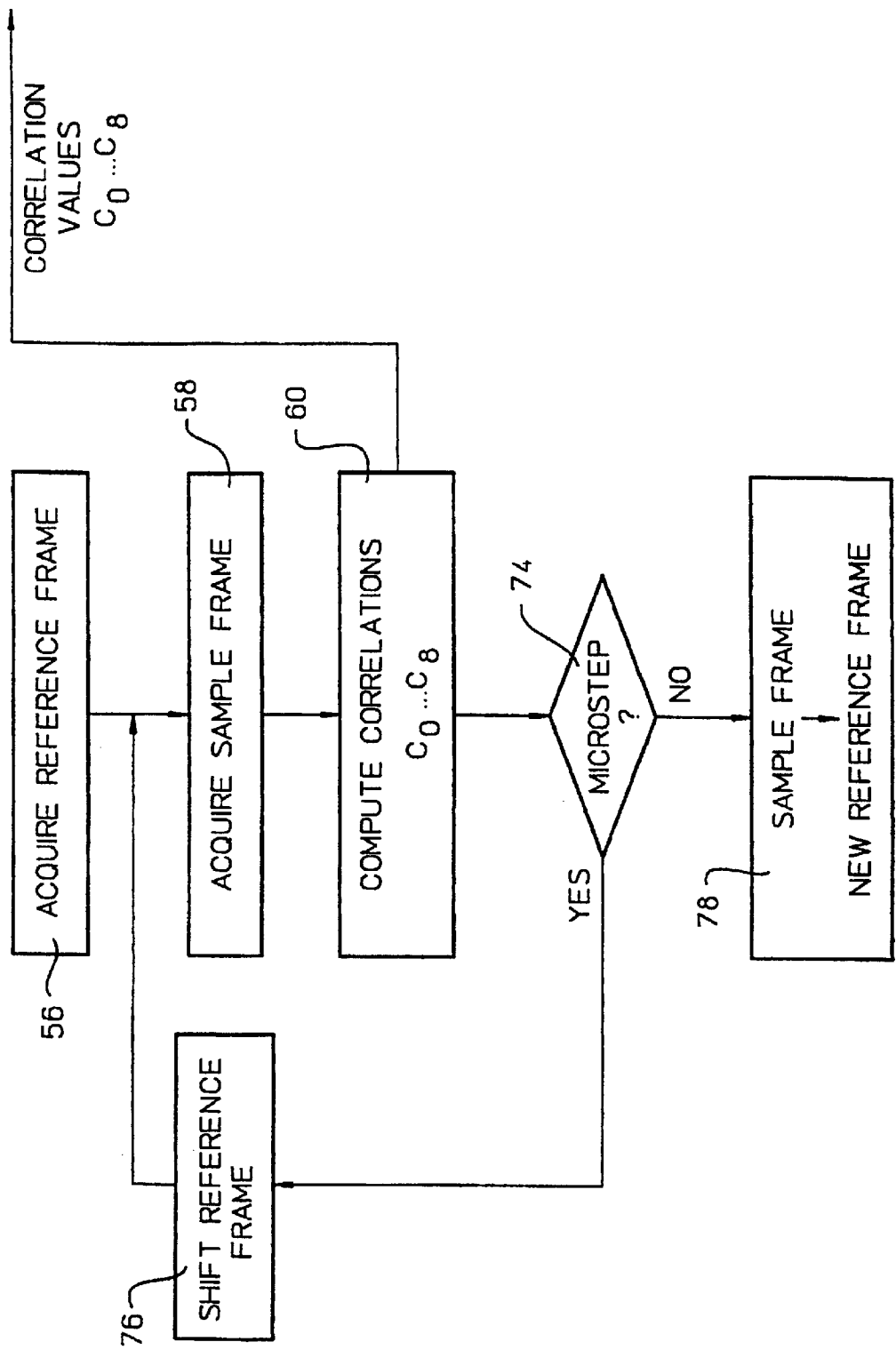
FIG. 5 is an operational view of one embodiment of the navigation processing of the scanning device of FIG. 1.

In FIG. 5, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 5 is typically performed for each navigation sensor.

In a first step 56, a reference frame is acquired. In effect, the reference frame is a start position. The position of a navigation sensor at a later time may be determined by acquiring in step 58 a sample frame of position data from the navigation sensor at the later time and then computing correlations in step 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

While the navigation processing is performed computationally, the concepts of this embodiment may be described with reference to FIGS. 5 and 6. A reference frame 62 is shown as having an image of a T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels. The navigation sensor is preferably forty-seven by forty-seven pixels, with a reference frame of 30×30 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 µs for velocities of 0.45 6meters/sec at 600 dpi. This relative displacement is referred to herein as a "microstep."

If the scanning device has moved during the time period between the acquiring step 56 for the reference frame 62 and the acquiring step 58 for the sample frame 66, the first and second images of the T-shaped feature will be ones in which the feature has shifted. While the preferred embodiment is one in which dt is less than the time that allows a full-pixel movement, the schematic representation of FIG. 6 is one in which the feature 64 is allowed to shift up and to the right by one pixel. The full-pixel shift is assumed only to simplify the representation.

Figure 6:
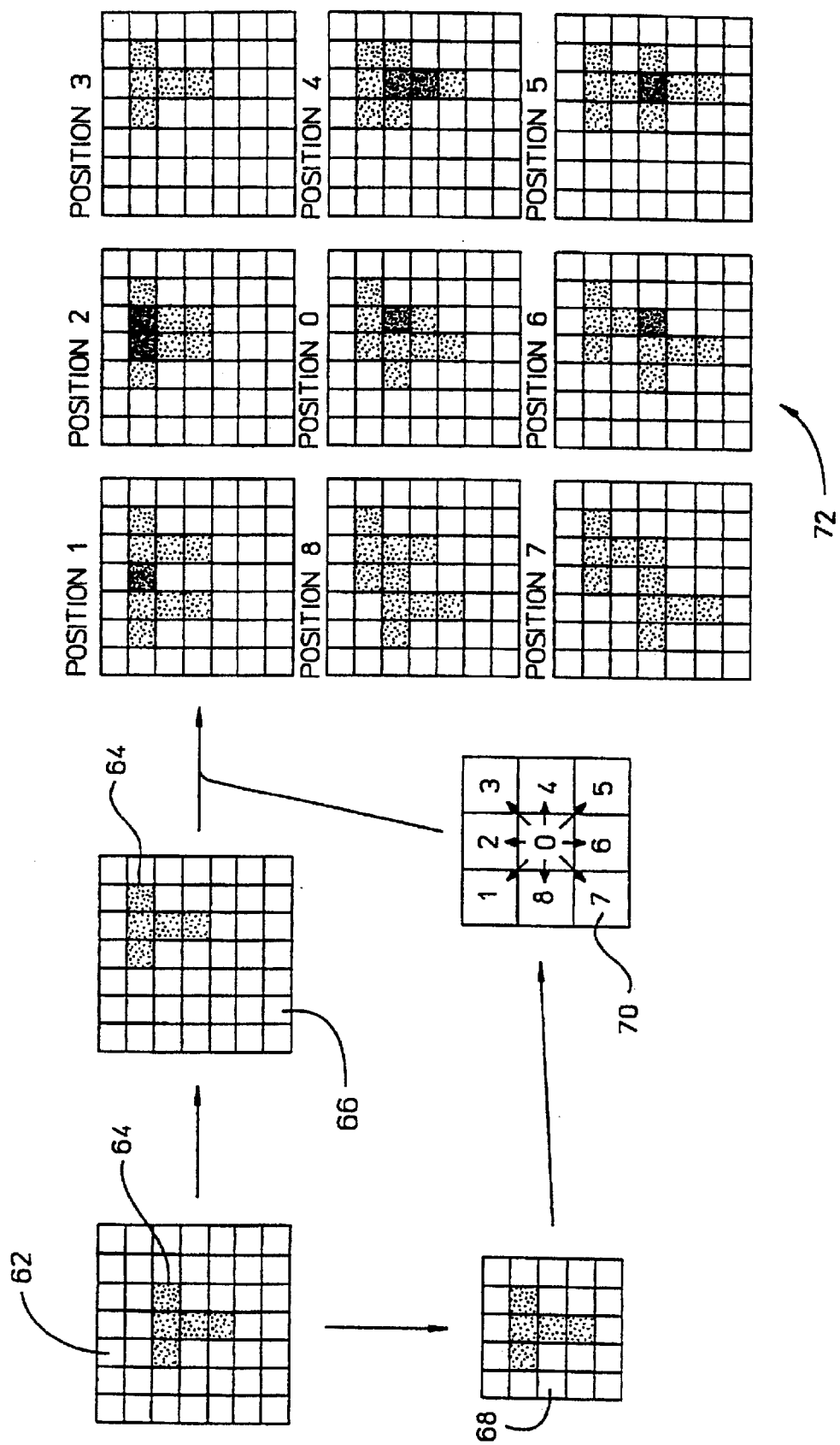
FIG. 6 is a schematical view of selected steps of FIG. 5.

Element 70 in FIG. 6 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 6, there are nine correlation coefficients ($C_k = C_0, C_1 \ldots C_8$) formed from the nine offsets at element 70, with the correlation coefficients being determined by equation:

$$C_k = \sum_i \sum_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 6, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 5, a determination 74 of whether a microstep is to be taken is made following each computation 64 of the correlations. If a microstep is required, the reference frame is shifted at 76. In this step, the sample frame 66 of FIG. 6 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Varying the sampling period allows the sampling rate, which corresponds to the pixel resolution in the motion direction, to be varied as well. Accordingly, when in the flip chart mode, as discussed below, the sampling period is adjusted to reduce the resolution of the captured image in the motion direction. By reducing the sampling period and thereby reducing the sampling rate, the amount of data corresponding to the captured image is also reduced.

Figure 7:
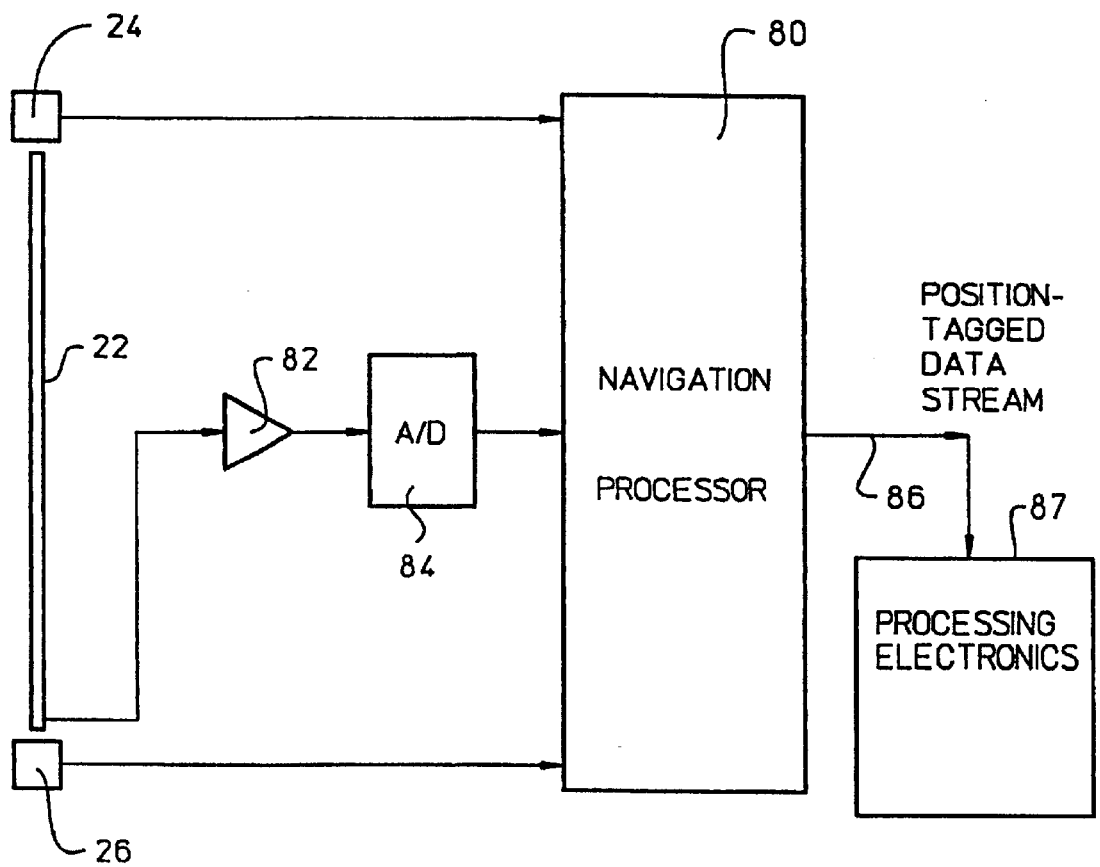
FIG. 7 is a block diagram of the components for carrying out the steps of FIG. 6.
Figure 8:
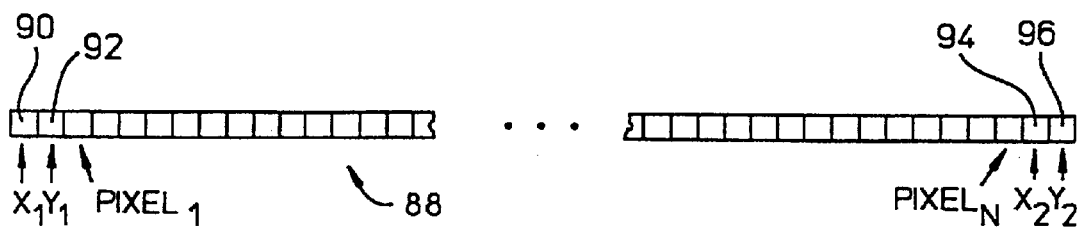
FIG. 8 is a representation of a position-tagged data stream typical of that output from FIG. 7.

Referring again to FIG. 7, the image signal generated at the imaging sensor 22 may then be "position-tagged" based upon the navigation data. In one embodiment, pixel values from the two navigation sensors 24 and 26 are received by a navigation processor 80 for performing the operations of FIGS. 5 and 6. Based upon the computed correlations, coordinates are determined for the current position of the first navigation sensor 24 ($X_1$, $Y_1$) and for the current position of the second navigation sensor 26 ($X_2$, $Y_2$). The navigation processor 80 also receives pixel values of the imaging sensor 22 via a pixel amplifier 82 and an analog-to-digital converter 84. Although FIG. 7 shows only a single tap from the image sensor 22 and a single A/D converter 84, multiple taps, each with an A/D converter, are within the scope of the invention. The current position coordinates of the navigation sensors are "tagged" at the ends of a line of data that corresponds to the number of pixels within the imaging sensor. The output 86 of the navigation processor 80 is therefore a position-tagged data stream. In FIG. 8 an increment 88 of the data stream is shown as having position coordinate cells 90, 92, 94 and 96 at the opposite ends of N pixel cells, although this ordering is not essential.

The position-tagged data stream at the output 86 of the navigation processor 80 may be first stored in image space that allows the image to fill memory locations which provide continuity in both the X and Y axes. Consequently, image acquisition is not restricted to scanning from an upper-left corner of an original to the lower-right corner. Because each image pixel is associated with a relative (X, Y) displacement from an arbitrary starting point, the image can expand in X and Y to the full size of the image memory.

The imaging sensor 22 is clocked as the scanning device moves across an original. The clocking ensures that the fastest moving element of the sensor samples at least once per pixel displacement. As previously noted with reference to FIG. 4, in the case of significant curvature of the scanning device 10 during image capture, one end of the imaging array will translate more rapidly than the other end, causing pixels at the slower end to be oversampled. This situation can be handled by either recording the most recent reading (for grayscales) or by recording in a logical OR mode (for binary images) at a specific pixel location in image space.

The next operation is to map the position-tagged increments. In one embodiment, the end points of the increments are joined by a line. Since the distance of each pixel of the imaging sensor 22 is fixed, the physical location of the pixels relative to the line can be calculated. One approach for determining the physical locations of each pixel is a modification of the Bresenham Raster Line Technique. The modification is that because the array of pixels in the imaging sensor is fixed, the line loop will be fixed at that same number. That is, the usual Bresenham algorithm is one in which the number of iterations in the line loop is the greater of delta_x and delta_y, i.e., max (delta_x, delta_y), but for the modified algorithm the number (N) of pixels along the array is used where max (delta_x, delta_y) is customarily used, so that the loop runs N times. The following program element describes this algorithm:

```
/************************************************************
Load pixel values with get_pixel( ) using location pairs
(xa, ya) and (xb, yb) of the endpoints of an N-element array
of pixel values using a modified Bresenham line draw
algorithm
************************************************************/
delta_x = xb – xa;
delta_y = yb – ya;
inc_x = (delta_x > 0) – (delta_x < 0); /* increments
are + 1 or –1 */
inc_y = (delta_y > 0) – (delta_y < 0);
delta_x* = inc_x; /* take absolute values */
delta_y * = inc_y;
x = xa;
y = ya;
x_err = 0;
y_err = 0;
for (i = 0; i < N; i++)
{ get_pixel(i / 2, x / 2, y / 2);
    x_err + = delta_x;
    y_err + = delta_y;
    if (x_err > = N)
    { x_err –= N;
    x += inc_x;
    if (y_err > = N)
    { y_err –= N;
    y += inc_y;
    }
}
```

Thus, given two points on a raster (xa, ya) and (xb, yb) which are the end points of an imaging sensor of N pixels, the purpose is to find successively the points (x, y) on the raster where each pixel is to be read. These points form the best approximation to a straight line connecting the end points at a and b. Take the differences in x and y. From the sign of the distances between a and b, determine whether x and y will be incremented or decremented as the line is traversed. Start at x=xa, y=ya, with two error registers x_err and y_err set to zero and begin the loop. Next, read the value at (x, y) and write it to the output raster using get_pixel( ). Given a linear image sensor with half the resolution of the navigation, use i/2, x/2, y/2 for the pixel number in the sensor and the position in the output raster. Add delta_x and delt_y to the respective error registers, then test both error registers to see if they exceed N. If so, subtract N from them and change x and/or y by the increment. If an error register does not exceed the N, continue to use the current value of x or y. The process continues until the loop has run N times.

The next step is to stitch successive image swaths within their region of overlap. This must be done in such a way as to identify and correct most of the accumulated navigation error and to mask any residual error. This "masking" can be done in areas of black print on a white background, for example, by stitching only in white space areas, i.e. areas with intensity values above a pre-described or adaptive threshold. The following paragraphs describe how redundant data from areas of overlap is identified (to be discarded) and how the navigation error is measured and corrected.

Techniques for stitching image swaths are known in the scanning art. These techniques typically require a pair of complete image swaths and produce a single, global transformation which brings the two swaths into registration. In this case, however, continuous navigation data provides the registration information needed for stitching. Since the navigation signal tends to accumulate error, it is continually amended by feeding back a correction signal derived from analysis of feature offsets.

Figure 9:
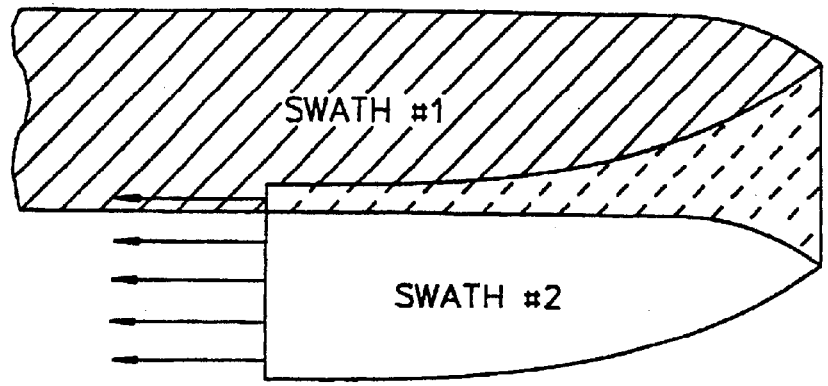
FIGS. 9 and 10 are representations of swaths by the scanning device of FIG. 1.
Figure 10:
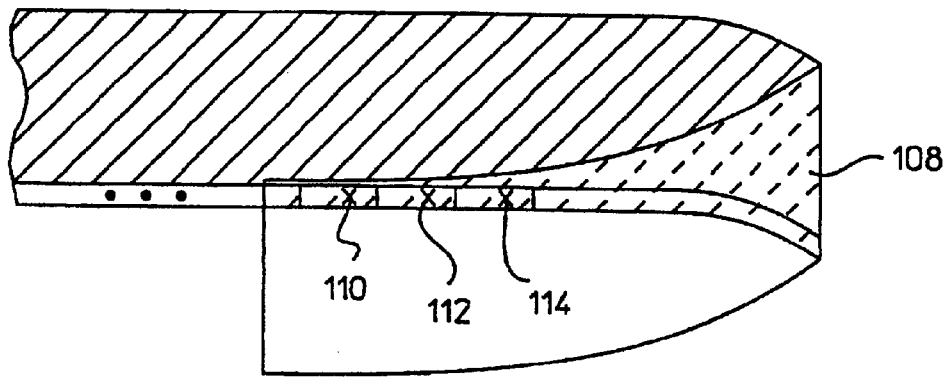

Some area of overlap is necessary in order to stitch two image swaths, since the navigation correction is calculated by correlating features within this area. Consider the situation portrayed in FIG. 9, where the Swath #1 is being resampled by the return pass, Swath #2. At time T, a partial swath has thus far been scanned. FIG. 10 highlights this overlap area 108. As shown in FIG. 10, during collection of Swath #1, quadrilateral image segments (henceforth called "registration tiles") are periodically labeled along the lower edge of the swath with the location of Tags 110, 112 and 114 that are described above. On a later pass (Swath #2) the "Surplus Overlap Area" 108 above the tagged areas of Swath #1 is clipped, using navigation information to determine where to clip. As each segment length in Swath #2 is acquired, the registration tile from Swath #1 is located in the top of what remains of Swath #2, after the "surplus" has been clipped. If the navigation data is perfect, there will be no offset between the location of Tag #1 and the location of that tile's rescanned image in Swath #2. More realistically, some navigation error will have accumulated since the last registration was performed. The offset between these two tiles produces a correction factor which is then used to update future navigation position-tags, associated with the data, in order to minimize the total accumulated error. In this way the total accumulated error in the navigation data is prevented from growing so large that it introduces an obvious distortion in the region of the swath overlap.

Since both Swath #1 and Swath #2 are combined to produce a single image, a buffer is used to temporarily store a copy of an original registration tile until Swath #2 has been located in it. The entire registration tile could be used for this correlation, but in the preferred embodiment a small area of high-frequency contrast (henceforth called a "feature") consisting of a rectangular tile (e.g., 15×15 pixels) of grey scale image is located within the registration tile of Swath #1 and saved to buffer. When the location of this feature is crossed for a second time, the offset between the location of the saved feature and the same feature in Swath #2 produces a navigation correction signal, i.e. the translation required to bring the two features into close correspondence. While other correlation approaches could be employed, an acceptable approach is a "sum of squared difference" correlation. A small search area is defined around the original location of the feature and correlation coefficients are determined by equation:

$$C_{k,l} = \sum_i \sum_j (T_{ij} - I_{i+k,j+l})^2$$

where $T_{i,j}$ denotes the grey scale values of the feature from Swath #1 and $I_{i+k, j+l}$ denotes the grey scale values of the newly acquired feature from Swath #2. Indices i and j specify locations within the features, while k and l specify the magnitude of the proposed translational offset (constrained to remain within the search space). The smallest element in the resulting correlation array denotes the offset between the two features. Sub-pixel positional accuracy my be obtained using interpolation to find the minima of this bowl-shaped result.

Figure 11:
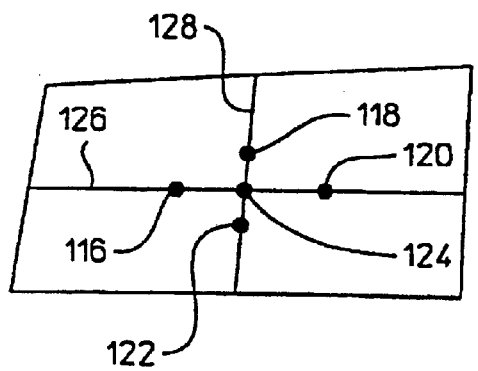
FIG. 11 is a representation of a registration tile that may be utilized to achieve stitching of successive swatches.

The feature within the registration tile is selected to maximize image variance, since this improves the accuracy of the correlation method. In one possible embodiment, only a subset of locations within the region is considered. These locations 116, 118, 120, 122 and 124 are shown in FIG. 11 as lying along the principal axes 126 and 128 of the registration tile (lines joining opposite midpoints of lines that define the region) and are sampled at the intersection and halfway between the intersection and each endpoint of the axis. For each location 116, 118, 120, 122 and 124, the variance $VAR_{k,l}$ is calculated using the equations:

$$SUM_{k,l} = \sum_i \sum_j I_{k+i,j+l}$$

$$SUM2_{k,l} = \sum_i \sum_j (I_{k+i,j+l})^2$$

$$VAR_{k,l} = SUM2_{k,l}/N - (SUM_{k,l})^2/N^2$$

In order to prevent obvious distortions in the final representative image, the error estimate is applied slowly; the "position-tags" are modified in small fixed magnitude steps as each new row of linear sensor data is loaded into memory, until there has been an accounting for the entire error.

In the preferred embodiment, the processing electronics 87 for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

The invention as described above allows a faithful duplication of an original image using the hand-held scanning device 10. In general, this duplication allows for an original of a particular size to be saved in memory and duplicated on a page equal to the size of the original. A difficulty arises when the scanning device 10 is used to generate a faithful duplication of an image on a page larger than 8.5"×11", A4 or other standard page sizes. In particular, since the image generated by the scanning device 10 is equal to the size of the scanned original image, the reproduction of this generated image is also equal to the size of the scanned original image. As a result, the image generated by the scanning device of an image larger than a standard page size cannot be printed on a standard page size. Even if scaled to print on a standard page size, the reproduced image may appear skewed or distorted.

To generate an image of an original from a page larger than a standard page and print the generated image on a standard page, the scanning device 10 includes a flip chart mode for scanning originals having a large page size. In the flip chart mode, the sampling rate of the scanning device is reduced to decrease the amount of image data captured in the motion direction. In addition, the captured image data is also downsampled to decrease the amount of image data corresponding to the sensor direction. The navigation data is also altered in a manner corresponding to the amount of downsampling of the captured image data. A reproduced image is then rectified and stitched together, in the manner as described above, using the altered image and navigation data. By printing the reproduced image at a standard resolution, the image from an original larger than a standard page size can be printed on a standard page without any skewing of the original image.

Figure 12:
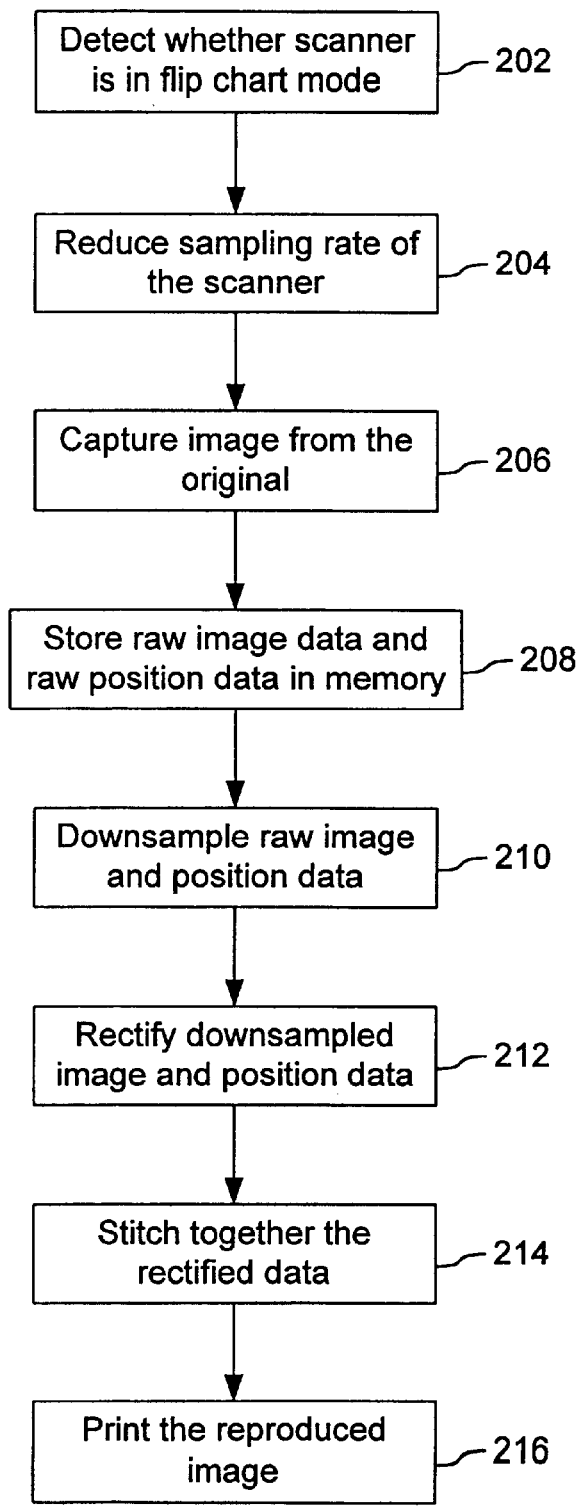
FIG. 12 is a flow diagram of an image reproduction process for a scanning device in a flip chart mode, consistent with the present invention.

FIG. 12 shows a flow diagram of a process for producing a reproduced image in a flip chart mode, consistent with the present invention. Before an original 14 is scanned, the scanning device 10 is checked to see if it is in the flip chart mode (step 202). If so, the sampling rate of the scanning device 10 is reduced (step 204). The sampling rate of the scanning device 10 corresponds to the resolution of the scanning device 10 in the motion direction. For example, a scanning device having a standard sampling rate of 300 dpi produces 300 pixels of data for each inch of the original over which the scanning device passes. Each time the imaging sensor 22 of the scanning device 10 acquires new pixel data, a line of pixel data is generated that corresponds to the pixel data captured in the sensor direction. Accordingly, for a sampling rate of 300 dpi, the imaging sensor 22 would generate 300 lines of pixel data per inch. If the imaging sensor 22 has a length of 127.0 mm and 1500 sensor elements, which corresponds to a resolution of 300 dpi in the sensor direction, each square inch of the captured image would have 300×300 pixels.

However, by reducing the standard sampling rate of the scanning device 10 to, for example, 75 dpi, each square inch of the captured image would have only 75×300 pixels.

Once the sampling rate is reduced, the scanning device 10 is passed over the surface of the original 14 to capture the image on the original (step 206). The image from the original 14 is captured by moving the scanning device over the original 14 in a manner consistent with that shown in FIGS. 1 and 9. The pixel data and the position data corresponding to the captured image are then stored in a memory (step 208). The memory may be resident in the scanning device 10 or may be external to the scanning device 10, such as in a personal computer connected to the scanning device. The pixel data stored in the memory is preferably stored in a single buffer.

When stored in a single buffer in the memory, a queue header stores details about the stored pixel data. In particular, the details held in the queue header include, for example, the size of each line of pixel data, the starting address of the buffer, the current position in the buffer, and the end of the buffer for wrap around purposes. The size of each line of pixel data depends upon the number of bits used to represent the gray scale, or gradation, for a particular pixel. The number of bits is typically 4 or 8 bits, which corresponds to a half byte (or nibble) and a full byte, respectively. To store the captured pixel data in a single buffer, a device, such as a direct memory access (DMA) device, can be used to transfer the data captured by the imaging sensor 22 to the buffer. In order to place the captured data in the appropriate location in the buffer, the DMA device refers to the information in the queue header, including the size of each line of pixel data.

Figure 13:
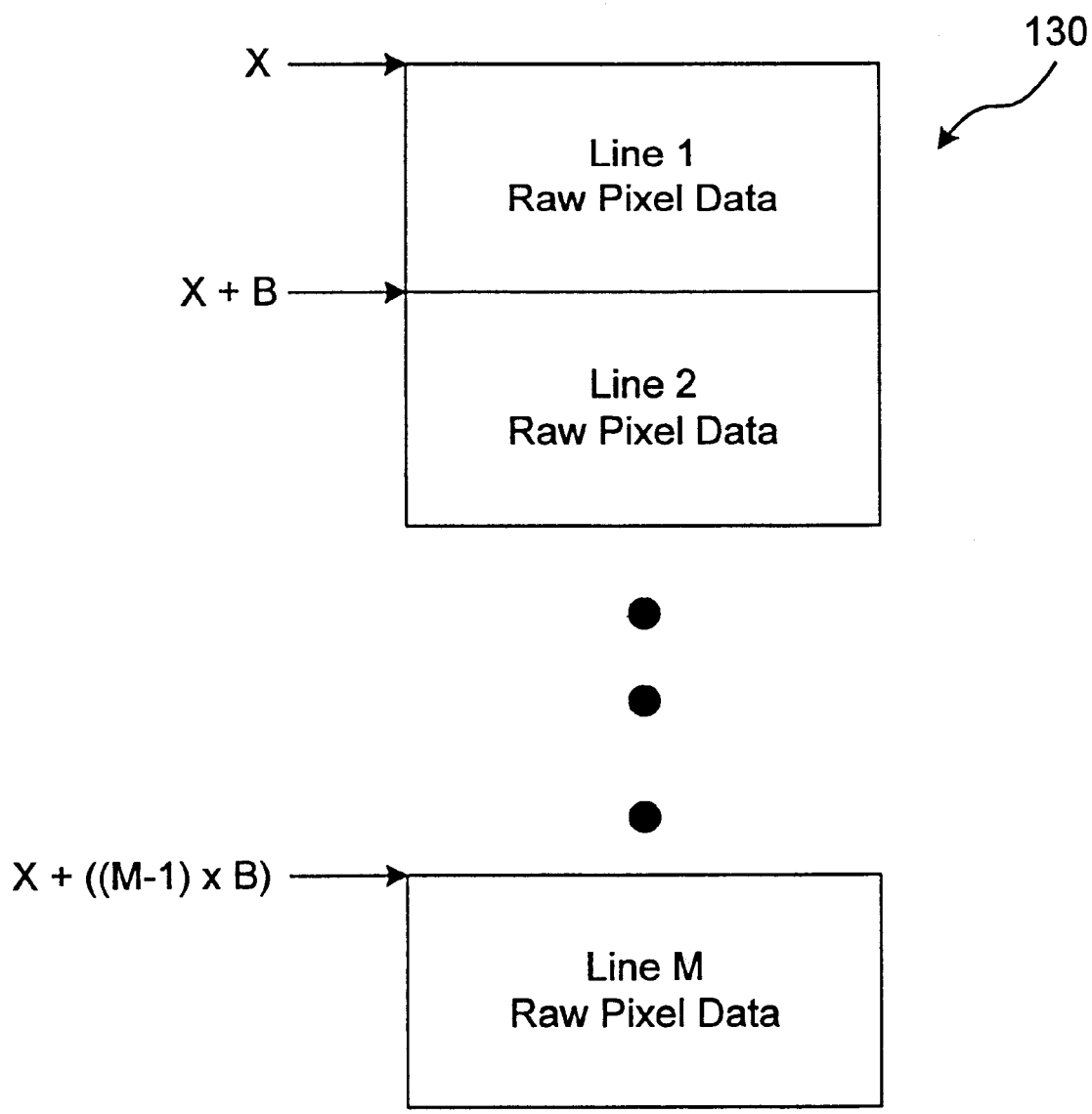
FIG. 13 is a block diagram of a memory buffer for storing image data capture during the image reproduction process of FIG. 12.

If the imaging sensor 22 is 127.0 mm and has a resolution of 300 dpi, then 1500 pixels are produced for each line captured. Accordingly, if the gray scale for each pixel is 4 bits, then each line of data is represented by 750 bytes. FIG. 13 shows a buffer 130 in a memory for holding M lines of data. Each line is preferably stored consecutively in the buffer. As shown in FIG. 13, line 1 of the raw pixel data starts at address X. Given that each line of data is represented by a block size B, such as 750 bytes, line 2 of the raw pixel data starts at address X+B. Accordingly, line M starts at address X+((M−1)×B).

After all of the lines of raw pixel data and position data are stored in the memory, the stored pixel data and position data is downsampled (step 210). To downsample the pixel data, the raw pixel data is transformed such that a decreased amount of data is used to represent the original raw pixel data. For example, if a line of pixel data has 1500 pixels, the line could be downsampled by generating one value for a grouping of pixels, such as for every four pixels. The resulting downsampled line would only have 375 pixel values.

There are several different ways to generate the one value from a grouping of pixels. Given a grouping of four pixels, the one value could be generated by taking an average of the gray scales for the four pixels. Alternatively, different weightings can be given to each of the different pixels within a grouping before taking the average to generate the one value. For example, the first and last pixels could be given heavier weightings while the middle pixels are given lesser weightings, or vise versa. Another approach is simply to make the one value equal to one of the pixels within the grouping. Other methods may also be possible as are known in the art.

Figure 14:
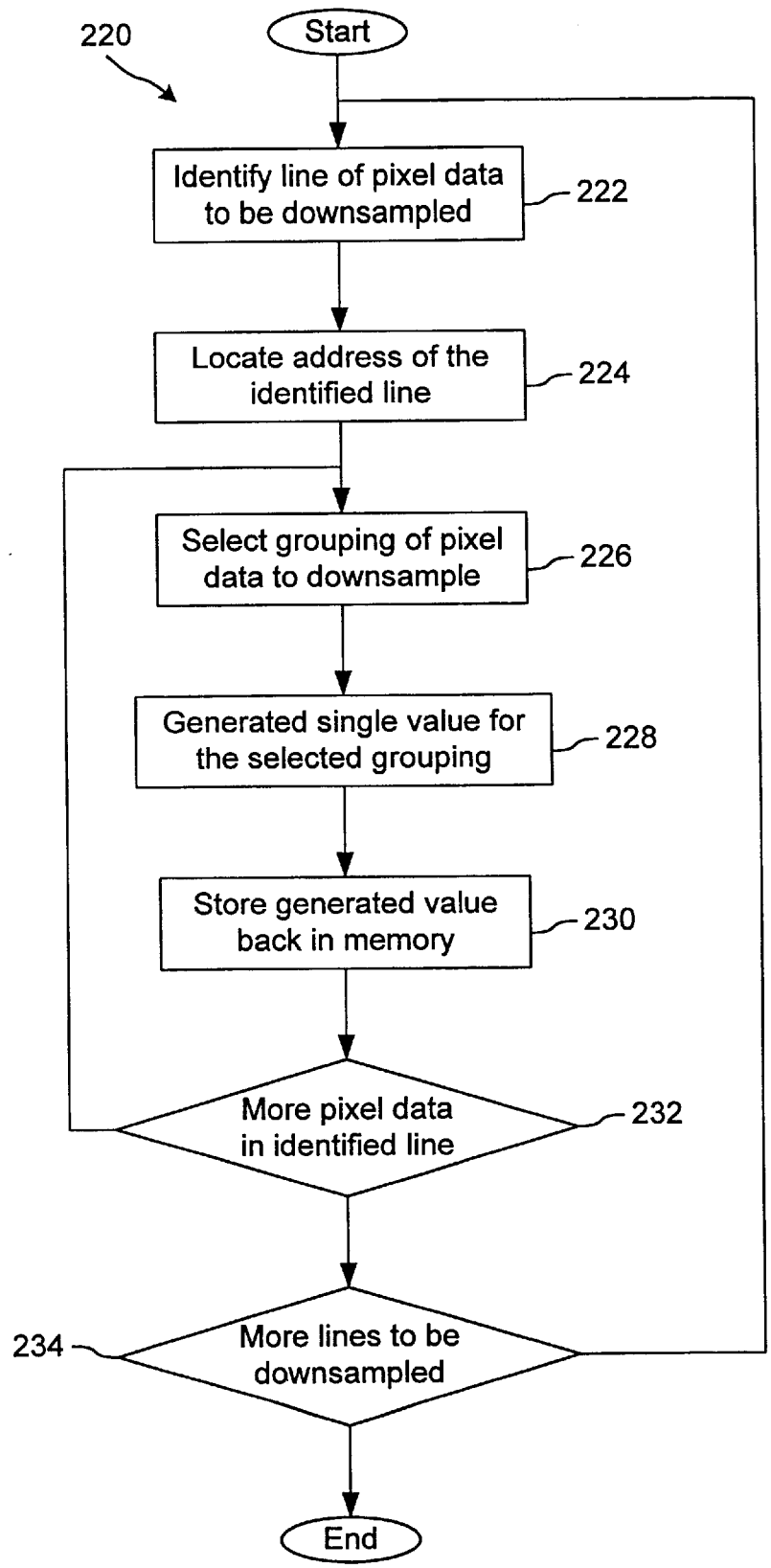
FIG. 14 is a flow diagram of a downsampling process used in the image reproduction process of FIG. 12.

FIG. 14 shows a flow diagram of a downsampling process 220 for the pixel data, consistent with the present invention. Once the downsampling process 220 starts, a line of raw pixel data, such as line 1 in FIG. 13, is identified to be downsampled (step 222). The downsampling process 220 then locates the address for the identified line, such as X for line 1 in FIG. 13 (step 224). Depending on the amount of downsampling, a group of pixels are selected for downsampling (step 226). The data is downsampled by a factor D, such as four. The actual value of the downsampling factor may be altered to be any value. The value is generally set to be higher for larger original images. For a downsampling factor of four, the group of pixels would also be four. Thus, if a line of data has 1500 pixel values, the downsampled data has only 375 pixel values, and therefore only requires a fourth of the memory space to store. A single value is generated for the selected group of pixel values, such as by taking an average of the pixel values (step 228).

Figure 15:
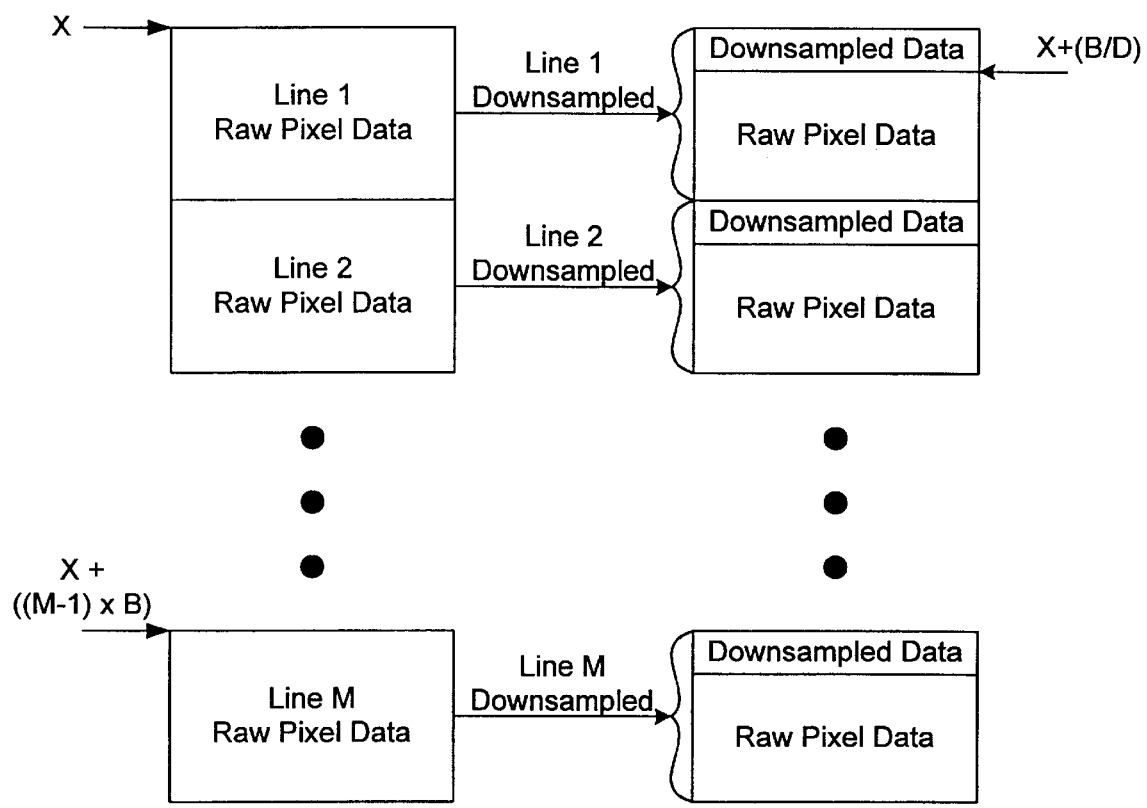
FIG. 15 is a block diagram of the memory buffer of FIG. 13 after the downsampling process of FIG. 14.

The generated single value is then stored back in memory (step 230). The generated single value may be stored back in the same buffer in which the original raw pixel data was stored. FIG. 15 shows a block diagram of a buffer 130 before and after the execution of the downsampling process 220. As shown in FIG. 15, the downsampled data for a particular line is stored in a fraction of the block in which the original raw pixel data was stored. The size of the downsampled data equals the block size B divided by the downsampling factor D (B/D). Since line 1 shown in FIG. 15 started at address X, the downsampled data for line 1 is stored between address X and address X+(B/D). Since the downsampled data only overwrites a portion of the original raw pixel data, the original raw pixel data that is not overwritten may remain in the buffer 130.

In FIG. 15, it is shown that the downsampled data for each line is written in the same block in the buffer 130 of the raw pixel data that corresponds to the downsampled line. It is also possible to write the downsampled data as a single continuous block of data within buffer 130 or in a buffer different from buffer 130. By writing the data as a single continuous block in buffer 130, it is easier to free up space to store other data.

After storing the generated value in the memory, the downsampling process 220 determines if there is any more pixel data left in the identified line (step 232). If so, then steps 226 through 230 are repeated to generate a value for the next group of pixels. If not, then all of the pixel data of the identified line has been downsampled. Having completed the downsampling of the identified line, the downsampling process 220 determines if there are any more lines to be downsampled (step 234). If so, then steps 222 through 232 are repeated to complete the downsampling of any remaining lines. If there are no more lines to be downsampled, then the downsampling process is complete.

To effectuate the downsampling process 220 the scanning device 10 can use either a hardware or software implementation, or some combination thereof. For example, the scanning device 10 could incorporate firmware having programming to instruct a processor in the scanning device 10 to perform the downsampling process 220. Alternatively, an application specific integrated circuit (ASIC) could be incorporated into the scanning device 10 to perform the downsampling process 220.

The navigation data is downsampled in a different manner than the pixel data. Instead of reducing the amount of data for representing the navigation data, the values for the navigation data are altered to reflect the amount of downsampling of the pixel data. As described above, the position data records the true position of the end points of the imaging sensor 22. For example, if the imaging sensor 22 has a length of 127.0 mm, then the end points of the imaging sensor where the navigation data is obtained would be 127.0 mm apart.

To downsample the navigation data, each navigation data value is reduced by the downsampling factor D. Accordingly, if the downsampling factor D has a value of four, then each navigation value is reduced by four. For example, a raw navigation data value of $(X_1, Y_1)$ becomes $(X_1/4, Y_1/4)$ after the downsampling.

Once the downsampling is complete, the process for producing a reproduced image in the flip chart mode generates a rectified image using the downsampled image and navigation data (step 212). The rectification of the image is performed in a manner as described above with reference to FIGS. 4–8. Based on the downsampling of the data in the flip chart mode, the rectification is performed on fewer pixels per line and fewer lines per inch. For example, if the imaging sensor 22 has a resolution of 300 dpi in the sensor direction with a length of 127.0 mm, which corresponds to having 1500 pixel sensors, a resolution in the motion direction of 300 dpi, and a downsampling factor of four, each line would have 375 pixels over a length of 127.0 mm and have 75 lines per inch. As a result, each square inch would have 75×75 pixels.

The rectified image is then stitched together to form a complete, reproduced image (step 214). The stitching is performed in a manner as described above with reference to FIGS. 9–11. Finally, the reproduced image can be printed (step 216). The reproduced image can be printed at a standard resolution, such as 300 dpi, and on a standard page size, such as A4, and be generated on the page without any skewing or distortion of the original image.

As an example of the flip chart mode process, assume that the imaging sensor 22 has a resolution of 300 dpi with a length of 127.0 mm, which corresponds to 1500 pixel sensors, and samples at a resolution of 300 dpi in the motion direction. Also assume that original image being scanned is 34"×44" in size. If it is detected that the scanning device 10 is in a flip chart mode, the resolution in the motion direction, i.e., the sampling rate, is reduced by some factor, for example, four, thereby reducing the sampling rate to 75 dpi.

The scanning device 10 is then passed over the entire original image, and the captured image is stored in memory, preferably in a single buffer. The data corresponding to the captured image includes pixel data and navigation or position data. With respect to the pixel data, each line includes 1500 pixel data values. If the pixel data is downsampled by a factor of four, then the number of pixel values in each line is reduced to 375. Since the pixel data is downsampled by a factor of four, the values of the navigation data are reduced by a factor of four as well. The reduction of the values of the navigation data is done by dividing each value by four. The downsampled data is then rectified and stitched together to form a complete, reproduced image.

Since each line after downsampling includes 375 pixel data values and the length of the imaging sensor 22 is 127.0 mm, the resolution of the pixel data in the sensor direction is 75 dpi. Accordingly, since the sampling rate is also 75 dpi, each square inch of the reproduced image has 75×75 pixels. The reproduced image is then printed at a standard resolution of 300 dpi.

Since the number of pixels in the motion direction is 75, and the printing resolution is 300 dpi, it takes 300 pixels in the motion direction to produce one inch of the image along the width of a standard page size of 8.5"×11". In other words, every inch printed on the standard page size in the motion direction uses four inches of pixel data from the reproduced image. It therefore takes 34" of the reproduced image, which is equal to the width of the original image, to cover the entire width of 8.5" of the standard page.

Similarly, it also takes 300 pixels in the sensor direction to produce one inch of the image along the length of a standard page size of 8.5"×11". Thus, every inch printed on the standard page size in the sensor direction also uses four inches of pixel data from the reproduced image. For the length of 11" of the standard page, it takes 44" of the reproduced image, which is equal to the length of the original image. Accordingly, using the flip chart mode, an original image of 34"×44" can be reproduced on a standard page size of 8.5"×11".

The values used in this example are merely for explanatory purposes. Other values may be used depending upon, for example, the standard resolution of the scanning device in the motion and sensor directions, the size of the original image, the printing resolution, etc. While the invention has been described and illustrated as one in which a planar original is scanned, this is not critical. In fact, persons skilled in the art will readily understand how these techniques may be used for scanning curved or three-dimensional images. However, the preferred embodiment is one in which the image of interest is formed on a medium, such as a piece of paper, a transparency, or a photograph, and the scanning device is in contact with the medium.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the cope of the invention be defined by the claims appended hereto, and their equivalents.

What is claimed is:

1. A method of forming an output image with a scanning device having an imaging unit, comprising:

moving the scanning device along a scan path over an original having an image;

capturing, with the imaging unit, a sequence of image data and position data in a sensor direction as the scanning device moves along the scan path, the position data being representative of travel of the scanning device along the scan path;

downsampling the captured image data by a predetermined factor from a first resolution to a second resolution lower than the first resolution;

modifying the position data in accordance with the predetermined factor; and forming a rectified image based upon the downsampled image data and the modified position data.

2. A method according to claim 1, wherein the capturing step includes the substep of detecting whether the scanning device is in a predetermined mode, wherein the resolution in a motion direction of the imaging unit is reduced from the standard sampling rate if the predetermined mode is detected.

3. A method according to claim 1, wherein the capturing step includes the substep of reducing the sampling rate of the imaging unit as the scanning device moves along the scan path.

4. A scanning device for forming an output image, comprising:

an imaging unit for capturing a sequence of image data as the scanning device moves along a scan path, a navigation unit for capturing position data representative of travel of the scanning device along the scan path;

a first processor for downsampling the captured image data by a predetermined factor from a first resolution to a second resolution lower than the first resolution, and for modifying the position data in accordance with the predetermined factor; and a second processor for forming a rectified image based upon the downsampled image data and the modified position data.

5. A scanning device according to claim 4, wherein the imaging processor includes a component for detecting whether the scanning device is in a predetermined mode, wherein the resolution in a motion direction of the imaging unit is reduced from the standard sampling rate if the predetermined mode is detected.

6. A scanning device according to claim 4, wherein imaging processor includes a component for reducing the sampling rate of the imaging unit as the scanning device moves along the scan path.

7. A computer readable storage device having a utility for forming an output image with a scanning device having an imaging unit, the utility comprising:

an image capture unit for capturing, with the imaging unit, a sequence of image data and position data in a sensor direction as the scanning device moves along the scan path, the position data being representative of travel of the scanning device along the scan path;

a transformation unit for downsampling the captured image data by a predetermined factor from a first resolution to a second resolution lower than the first resolution and modifying the position data in accordance with the predetermined factor; and a rectification unit for forming a rectified image based upon the downsampled image data and the modified position data.

8. A computer readable storage device according to claim 7, wherein the image capture unit includes a module for detecting whether the scanning device is in a predetermined mode, wherein the resolution in a motion direction of the imaging unit is reduced from the standard sampling rate if the predetermined mode is detected.

9. A computer readable storage device according to claim 7, wherein image capture unit includes a module for reducing the sampling rate of the imaging unit as the scanning device moves along the scan path.

* * * * *